US012192839B2

(12) United States Patent
Fujishiro

(10) Patent No.: US 12,192,839 B2
(45) Date of Patent: Jan. 7, 2025

(54) HANDOVER CONTROL METHOD, RELAY APPARATUS, AND DONOR APPARATUS

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 499 days.

(21) Appl. No.: 17/675,703

(22) Filed: Feb. 18, 2022

(65) Prior Publication Data
US 2022/0174564 A1 Jun. 2, 2022

Related U.S. Application Data

(63) Continuation of application No. PCT/JP2020/030008, filed on Aug. 5, 2020.

(30) Foreign Application Priority Data

Aug. 21, 2019 (JP) .............................. JP2019-151550

(51) Int. Cl.
H04W 36/02 (2009.01)
H04W 16/26 (2009.01)
H04W 88/04 (2009.01)
H04W 84/04 (2009.01)

(52) U.S. Cl.
CPC ........... H04W 36/02 (2013.01); H04W 16/26 (2013.01); H04W 88/04 (2013.01); H04W 84/047 (2013.01)

(58) Field of Classification Search
None
See application file for complete search history.

(56) References Cited

U.S. PATENT DOCUMENTS

| 2012/0252355 A1* | 10/2012 | Huang .............. H04W 36/0033 455/7 |
| 2015/0049734 A1* | 2/2015 | Park .................... H04W 76/27 370/331 |
| 2015/0131618 A1* | 5/2015 | Chen ................... H04W 84/005 370/332 |
| 2020/0092784 A1* | 3/2020 | Hampel ................ H04W 76/27 |
| 2022/0361067 A1* | 11/2022 | Koskinen ........... H04B 7/15528 |

FOREIGN PATENT DOCUMENTS

CN 102474337 B * 2/2014 ............. H04B 7/155

OTHER PUBLICATIONS

Handover Enhancement in LTE-Advanced Relay Networks, Chen, 2012 (Year: 2012).*
Integrated Access Backhauled Networks, Teyeb, 2019 (Year: 2019).*
ZTE Corporation, Sanechips, "New work item: 2-step RACH for NR"; 3GPP TSG RAN Meeting #82, RP-182894; Dec. 10-13, 2018, pp. 1-5, Sorrento, Italy.

* cited by examiner

Primary Examiner — Jay L Vogel
(74) Attorney, Agent, or Firm — Studebaker & Brackett PC

(57) ABSTRACT

A first donor apparatus 200S transmits to the UE 100 a first handover command indicating a handover of a UE 100 (lower apparatus) lower than an IAB node 300. The IAB node 300 receives the first handover command addressed to the UE 100, and then suspends transfer of the first handover command to the UE 100 until a handover of the IAB node 300 is performed.

7 Claims, 7 Drawing Sheets

HANDOVER CONTROL METHOD, RELAY APPARATUS, AND DONOR APPARATUS

RELATED APPLICATIONS

The present application is a continuation based on PCT Application No. PCT/JP2020/030008, filed on Aug. 5, 2020, which claims the benefit of Japanese Patent Application No. 2019-151550 filed on Aug. 21, 2019. The content of which is incorporated by reference herein in their entirety.

TECHNICAL FIELD

The present disclosure relates to a handover control method, a relay apparatus, and a donor apparatus used in a mobile communication system.

BACKGROUND ART

In the 3rd Generation Partnership Project (3GPP), which is a standardization project of a mobile communication system, a new relay apparatus referred to as an Integrated Access and Backhaul (IAB) node has been under study. One or a plurality of relay apparatuses are involved in communication between a base station serving as a donor apparatus and a user equipment, and perform relay for the communication.

Such a relay apparatus includes a user equipment function and a base station function, and performs wireless communication with an upper apparatus (the base station or an upper relay apparatus) by using the user equipment function and performs wireless communication with a lower apparatus (the user equipment or a lower relay apparatus) by using the base station function.

A wireless section between the user equipment and the relay apparatus or the base station may be referred to as an access link. A wireless section between the relay apparatus and the base station or another relay apparatus may be referred to as a backhaul link. Non-Patent Document 1 describes a method of dynamically switching data transfer paths by integrating and multiplexing, in Layer 2, data communication in the access link and data communication in the backhaul link and dynamically allocating radio resources to the backhaul link.

PRIOR ART DOCUMENT

Non-Patent Document

Non-Patent Document 1: 3GPP Contribution "RP-182894"

SUMMARY

A handover control method according to a first aspect is a control method for performing a handover of a relay apparatus from a first donor apparatus or an apparatus lower than the first donor apparatus to a second donor apparatus or an apparatus lower than the second donor apparatus. The handover control method includes: transmitting, by the first donor apparatus, a first handover command indicating a handover of a lower apparatus lower than the relay apparatus to the lower apparatus; receiving, by the relay apparatus, the first handover command, and then suspending transfer of the first handover command to the lower apparatus until the handover of the relay apparatus is performed; and by the relay apparatus, in response to performance of the handover of the relay apparatus, transferring to the lower apparatus the first handover command of which the transfer is suspended.

A relay apparatus according to a second aspect is a relay apparatus for performing a handover from a first donor apparatus or an apparatus lower than the first donor apparatus to a second donor apparatus or an apparatus lower than the second donor apparatus. The relay apparatus includes at least one processor configured to execute: receiving a first handover command transmitted from the first donor apparatus and indicating a handover of a lower apparatus lower than the relay apparatus; receiving the first handover command and then suspending transfer of the first handover command to the lower apparatus until the handover of the relay apparatus is performed; and transferring to the lower apparatus the first handover command of which the transfer is suspended in response to performance of the handover of the relay apparatus.

A donor apparatus according to the third aspect is a first donor apparatus for a handover of a relay apparatus from the first donor apparatus or an apparatus lower than the first donor apparatus to a second donor apparatus or an apparatus lower than the second donor apparatus. The donor apparatus includes at least one processor configured to execute transmitting to the relay apparatus a first message for suspending an operation of transfer from the relay apparatus to a lower apparatus lower than the relay apparatus until the handover of the relay apparatus is performed, transmitting, to the lower apparatus lower than the relay apparatus, a first handover command indicating a handover of the lower apparatus, and transmitting to the relay apparatus a second handover command indicating the handover of the relay apparatus.

DESCRIPTION OF EMBODIMENTS

A scenario is assumed in which a handover of a relay apparatus is performed from a first donor apparatus (or an apparatus under the first donor apparatus) to a second donor apparatus (or an apparatus under a second donor apparatus). When, for example, the relay apparatus is configured to be movable, the relay apparatus needs to perform a handover between different donor apparatuses.

In such a scenario, when the relay apparatus and a lower apparatus under the relay apparatus separately (i.e., asynchronously) perform a handover, the communication of the lower apparatus may be disrupted. A user equipment may be present as the lower apparatus, and thus, when a handover procedure needs to be significantly changed for the relay apparatus and operations of the user equipment as the lower apparatus needs to be changed, ensuring backward compatibility of the user equipment is difficult.

Thus, an object of the present disclosure is to realize the handover of the relay apparatus between different donor apparatuses with disrupted communication of the lower apparatuses suppressed and with the backward compatibility ensured.

A mobile communication system according to an embodiment will be described with reference to the drawings. In the description of the drawings, the same or similar parts are denoted by the same or similar reference signs.

Configuration of Mobile Communication System

Figure 1:
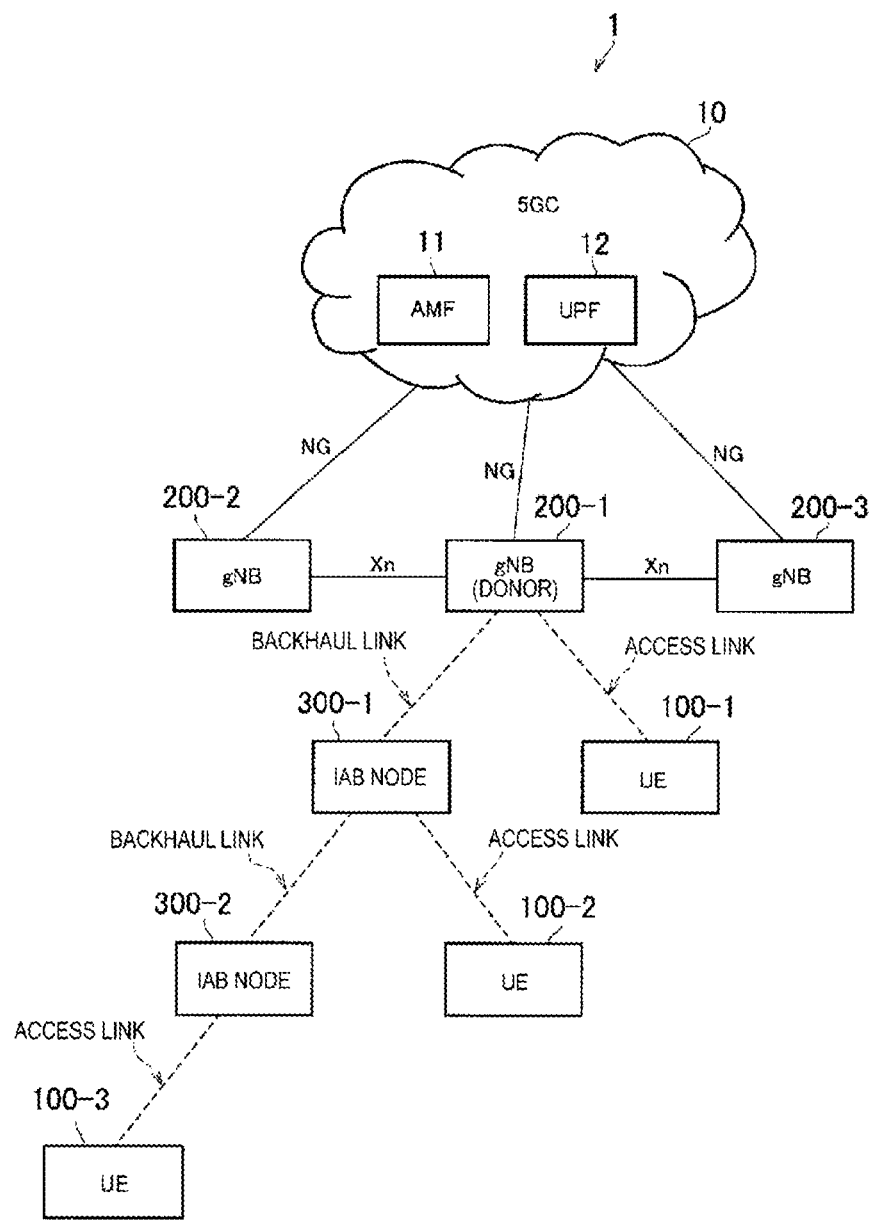
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system 1 according to an embodiment. The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is an example of a relay apparatus.

An embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

The gNB 200 is connected to the 5GC 10 via an interface referred to as an NG interface. FIG. 1 illustrates an example of three gNB 200-1 to gNB 200-3 that are connected to the 5GC 10. The gNB 200 is a fixed wireless communication apparatus that performs wireless communication with the UE 100. When the gNB 200 has a donor function, the gNB 200 may perform wireless communication with the IAB node that is connected to the gNB 200 wirelessly.

The gNB 200 is connected to another neighboring gNB 200 via an inter-base station interface referred to as an Xn interface. FIG. 1 illustrates an example in which the gNB 200-1 is connected to the gNB 200-2 and the gNB 200-2.

Each gNB 200 manages one or a plurality of cells. The cell is used as a term denoting a minimum unit of a wireless communication area. The cell may be used as a term denoting a function or a resource for performing wireless communication with the UE 100. One cell belongs to one carrier frequency.

The UE 100 is a mobile wireless communication apparatus that can perform wireless communication with the gNB 200. The UE 100 may perform wireless communication with the IAB node 300. The UE 100 may be any type of apparatus as long as the UE 100 performs wireless communication with the gNB 200 or the IAB node 300. For example, the UE 100 is a mobile phone terminal, a tablet terminal, a laptop PC, a sensor, an apparatus that is provided in a sensor, a vehicle, or an apparatus that is provided in a vehicle.

FIG. 1 illustrates an example in which UE 100-1 is connected to the gNB 200-1 wirelessly, UE 100-2 is connected to an IAB node 300-1 wirelessly, and UE 100-3 is connected to an IAB node 300-2 wirelessly. The UE 100-1 directly performs communication with the gNB 200-1. The UE 100-2 indirectly performs communication with the gNB 200-1 via the IAB node 300-1. The UE 100-3 indirectly performs communication with the gNB 200-1 via the IAB node 300-1 and the IAB node 300-2.

The IAB node 300 is an apparatus (relay apparatus) that is involved in communication between the eNB 200 and the UE 100, and performs relay for the communication. FIG. 1 illustrates an example in which the IAB node 300-1 is connected to the gNB 200-1 being a donor apparatus wirelessly, and the IAB node 300-2 is connected to the IAB node 300-1 wirelessly. Each IAB node 300 manages a cell. A cell ID of the cell managed by the IAB node 300 may be the same as or different from a cell ID of the cell of the donor gNB 200-1.

The IAB node 300 has a UE function (user equipment function) and a gNB function (base station function). Such UE functions may be referred to as MTs, and gNB functions may be referred to as DUs.

The IAB node 300 performs wireless communication with an upper apparatus (the gNB 200 or an upper IAB node 300) by using the UE function (MT) of the IAB node 300, and performs wireless communication with a lower apparatus (the UE 100 or a lower IAB node 300) by using the gNB function (DU) of the IAB node 300. Note that the UE function (MT) refers to at least some of the functions of the UE 100, and the IAB node 300 need not necessarily have all of the functions of the UE 100. The gNB function (DU) refers to at least some of the functions of the gNB 200, and the IAB node 300 need not necessarily have all of the functions of the gNB 200. For example, the gNB function (DU) need not include an RRC layer, a PDCP layer, or the like.

A wireless section between the UE 100 and the IAB node 300 or the gNB 200 may be referred to as an access link (or, Uu). A wireless section between the IAB node 300 and the gNB 200 or another IAB node 300 may be referred to as a backhaul link (or, Un). The backhaul link may be referred to as a fronthaul link.

Data communication in the access link and data communication in the backhaul link can be integrated and multiplexed in Layer 2, radio resources can be dynamically allocated to the data communication in the backhaul link, and paths of relay can be dynamically switched. Note that, for the access link and the backhaul link, millimeter wave bands may be used. The access link and the backhaul link may be multiplexed by means of time division multiplexing and/or frequency division multiplexing.

Configuration of Base Station

Figure 2:
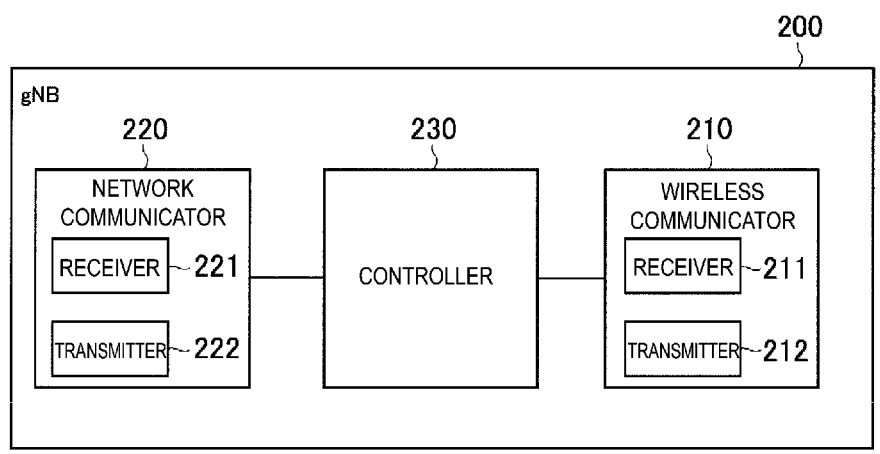
FIG. 2 is a diagram illustrating a configuration of a base station according to an embodiment.

Now, a configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 is used for wireless communication with the UE 100 and wireless communication with the IAB node 300. The wireless communicator 210 includes a receiver 211 and a transmitter 212. The receiver 211 performs various types of reception while being controlled by the controller 230. The receiver 211 includes an antenna, and converts a radio signal received by the antenna into a baseband signal (received signal) and outputs the baseband signal to the controller 230. The transmitter 212 performs various types of transmission while being controlled by the controller 230. The transmitter 212 includes an antenna, and converts a baseband signal (transmission signal) to be output by the controller 230 into a radio signal and transmits the radio signal from the antenna.

The network communicator 220 is used for wired communication (or wireless communication) with the 5GC 10 and wired communication (or wireless communication) with another neighboring gNB 200. The network communicator 220 includes a receiver 221 and a transmitter 222. The receiver 221 performs various types of reception while being controlled by the controller 230. The receiver 221 receives a signal from the outside and outputs the received signal to the controller 230. The transmitter 222 performs various types of transmission while being controlled by the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing described below.

Configuration of Relay Apparatus

Figure 3:
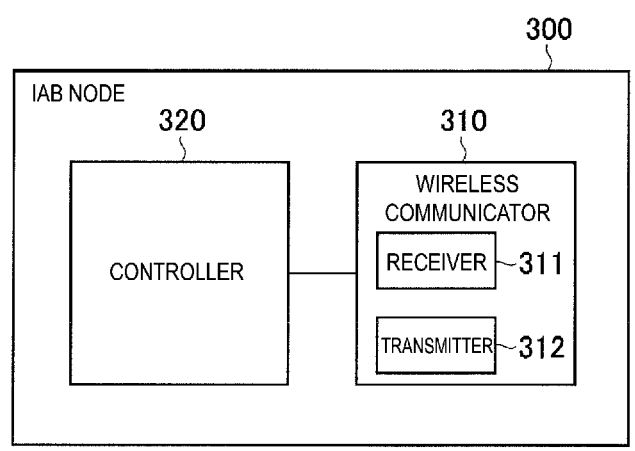
FIG. 3 is a diagram illustrating a configuration of a relay apparatus according to an embodiment.

Now, a configuration of the IAB node 300, corresponding to a relay apparatus according to an embodiment, will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 is used for wireless communication (backhaul link) with the gNB 200 and wireless communication (access link) with the UE 100. The wireless communicator 310 for the backhaul link communication and the wireless communicator 310 for the access link communication may be provided separately.

The wireless communicator 310 includes a receiver 311 and a transmitter 312. The receiver 311 performs various types of reception while being controlled by the controller 320. The receiver 311 includes an antenna, and converts a radio signal received by the antenna into a baseband signal (received signal) and outputs the baseband signal to the controller 320. The transmitter 312 performs various types of transmission while being controlled by the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing described below.

Configuration of User Equipment

Figure 4:
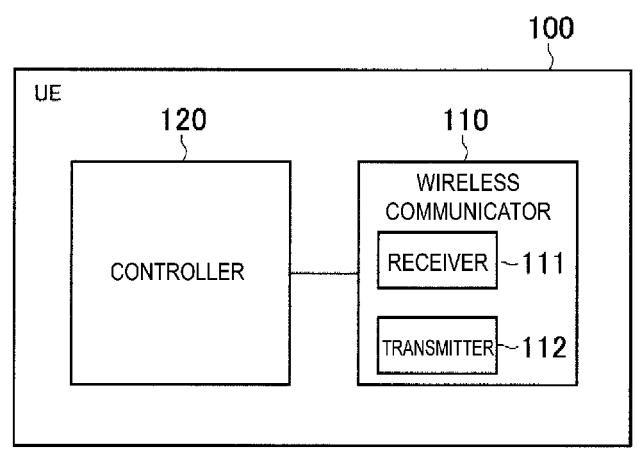
FIG. 4 is a diagram illustrating a configuration of a user equipment according to an embodiment.

Now, a configuration of the UE 100, corresponding to a user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 is used for wireless communication in the access link, specifically, wireless communication with the gNB 200 and wireless communication with the IAB node 300. The wireless communicator 110 includes a receiver 111 and a transmitter 112. The receiver 111 performs various types of reception while being controlled by the controller 120. The receiver 111 includes an antenna, and converts a radio signal received by the antenna into a baseband signal (received signal) and outputs the baseband signal to the controller 120. The transmitter 112 performs various types of transmission while being controlled by the controller 120. The transmitter 112 includes an antenna, and converts a baseband signal (transmission signal) to be output by the controller 120 into a radio signal and transmits the radio signal from the antenna.

The controller 120 performs various types of control in the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing described below.

Example of Protocol Stack Configuration

Figure 5:
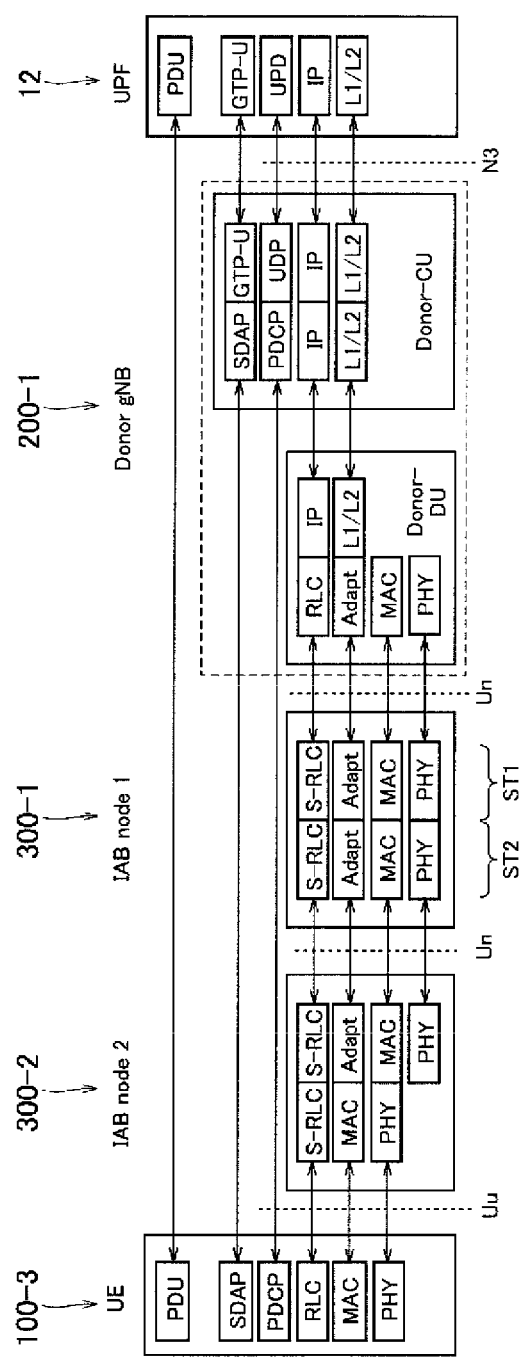
FIG. 5 is a diagram illustrating an example of a protocol stack configuration according to an embodiment.

Now, an example of a protocol stack configuration in the mobile communication system 1 according to an embodiment will be described. FIG. 5 is a diagram illustrating an example of a protocol stack configuration of a user plane. FIG. 5 illustrates an example of a protocol stack configuration related to user data transmission between the UE 100-3 and the UPF 12 of the 5GC 10 illustrated in FIG. 1.

As illustrated in FIG. 5, the UPF 12 includes a GPRS Tunneling Protocol for User Plane (GTP-U), a User Datagram Protocol (UDP), an Internet Protocol (IP), and a Layer 1/Layer 2 (L1/L2). The gNB 200-1 (donor gNB) is provided with a protocol stack corresponding to these.

The gNB 200-1 includes a central unit (CU) and a distributed unit (DU). Of the protocol stack of the radio interface, the CU includes layers at and higher than a Packet Data Convergence Protocol (PDCP), the DU includes layers at and lower than a Radio Link Control (RLC), and the CU and the DU are connected via an interface referred to as an F1 interface.

Specifically, the CU includes a Service Data Adaptation Protocol (SDAP), a PDCP, an IP, and an L1/L2. The SDAP and the PDCP of the CU perform communication with the SDAP and the PDCP of the UE 100 via the DU, the IAB node 300-1, and the IAB node 300-2.

Of the protocol stack of the radio interface, the DU includes an RLC, an adaptation layer (Adapt), a Medium Access Control (MAC), and a Physical layer (PHY). These protocol stacks are protocol stacks for the gNB. Note that the upper/lower relationship between the adaptation layer and the RLC (S-RLC) may be inverted. The adaptation layer may be referred to as a backhaul adaptation protocol (BAP) layer.

In the IAB node 300-1, a protocol stack ST1 for the UE corresponding to these is provided. In addition, in the IAB node 300-1, a protocol stack ST2 for the gNB is provided. Each of the protocol stack ST1 and the protocol stack ST2 includes layers (sub-layers) at or lower than Layer 2. Specifically, the IAB node 300-1 is a Layer 2 relay apparatus that performs relay of user data by using the layers at or lower than Layer 2. The IAB node 300-1 performs relay of data without using layers at or higher than Layer 3 (specifically, layers at or higher than the PDCP). Note that the IAB node 300-2 includes a protocol stack configuration similar to that of the IAB node 300-1.

The protocol stack configuration in the user plane has been described above. However, in the control plane, each of the gNB 200-1, the IAB node 300-1, the IAB node 300-2, and the UE 100-3 includes a Radio Resource Control (RRC) corresponding to Layer 3.

RRC connection is established between the RRC of the gNB 200-1 (donor gNB) and the RRC of the IAB node 300-1, and an RRC message is transmitted and received using the RRC connection. RRC connection is established between the RRC of the gNB 200-1 and the RRC of the IAB node 300-2, and an RRC message is transmitted and received using the RRC connection. In addition, RRC connection is established between the RRC of the gNB 200-1 and the RRC of the UE 100-3, and an RRC message is transmitted and received using the RRC connection.

Operation According to Embodiment

Figure 6:
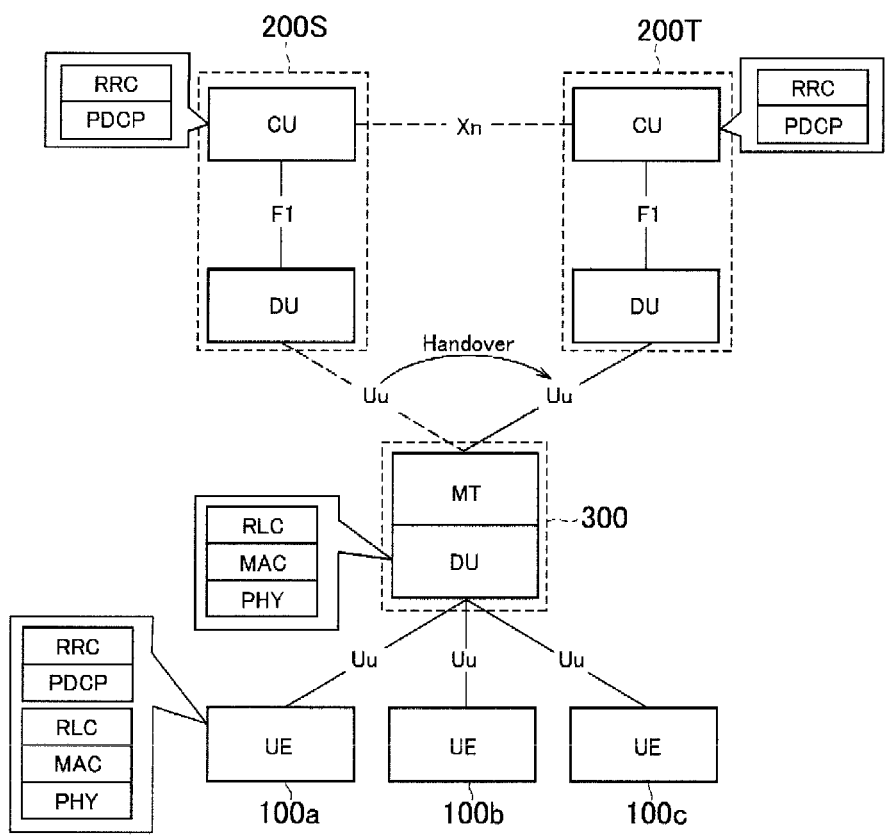
FIG. 6 is a diagram illustrating an operation scenario for a mobile communication system according to an embodiment.

Now, operations of a mobile communication system 1 according to an embodiment will be described. FIG. 6 is a diagram illustrating an operation scenario for the mobile communication system 1 according to an embodiment.

As illustrated in FIG. 6, a scenario is assumed in which a handover of an IAB node 300 is performed from a first donor apparatus 200S to a second donor apparatus 200T. The first donor apparatus 200S and the second donor apparatus 200T are different gNBs 200. In the following, when the first donor apparatus 200S and the second donor apparatus 200T are not particularly distinguished from each other, each of the donor apparatuses is simply referred to as "donor apparatus 200".

Each donor apparatus 200 includes a CU and a DU. The CU and DU are connected to each other via an F1 interface. The CU includes an upper layer (RRC layer and PDCP layer). The DU includes a lower layer (RLC layer, MAC layer, and PHY layer). An Xn interface being an interface between base stations is present between the CU of the first donor apparatus 200S and the CU of the second donor apparatus 200T.

The scenario in which a handover of the IAB node 300 is performed from the first donor apparatus 200S to the second donor apparatus 200T is hereinafter referred to as the "Inter-CU handover of the IAB node 300".

FIG. 6 illustrates an example scenario in which the inter-CU handover of the IAB node 300 is performed from the first donor apparatus 200S to the second donor apparatus 200T. However, the inter-CU handover of the IAB node 300 may be performed from an apparatus under the first donor apparatus 200S (IAB node lower than the first donor apparatus 200S) to an apparatus under the second donor apparatus 200T (IAB node lower than the second donor apparatus 200T). Specifically, before the inter-CU handover of the IAB node 300, one or a plurality of IAB nodes may be present on a path between the IAB node 300 and the first donor apparatus 200S. After the inter-CU handover of the IAB node 300, one or a plurality of IAB nodes may be present on the path between the IAB node 300 and the second donor apparatus 200T.

In FIG. 6, a plurality of UEs 100 (UE 100a to UE 100c) are illustrated as lower apparatuses under the IAB node 300. However, lower IAB nodes may be present under the IAB node 300. In other words, the lower apparatus under the IAB node 300 refers to at least one of the UE 100 and lower IAB node. In the following description, an example in which the lower apparatus under the IAB node 300 is the UE 100 will be primarily described. The UE 100 is connected to the DU of the IAB node 300 via a Uu interface.

The IAB node 300 includes an MT and a DU. The MT of the IAB node 300 is connected to the DU of the donor apparatus 200 via the Uu interface. The Uu interface between the MT of the IAB node 300 and the DU of the donor apparatus 200 is used as a backhaul link. The IAB node 300 includes a BAP layer. The BAP layer may be positioned in an intermediate layer between the MT and the DU, or at least a portion of the BAP layer may be incorporated in the MT and/or DU.

Each of UE 100 and MT has an upper layer and a lower layer (RRC layer, PDCP layer, RLC layer, MAC layer, and PHY layer). The lower layer (RLC layer, MAC layer, and PHY layer) of each UE 100 communicates with the DU (RLC layer, MAC layer, and PHY layer) of the IAB node 300. On the other hand, the upper layer (RRC layer and PDCP layer) of each UE 100 communicates with the CU (RRC layer and PDCP layer) of the donor apparatus 200.

In such a scenario, the first donor apparatus 200S transmits, to the UE 100, a first handover command indicating a handover of the UE 100 under the IAB node 300. The first handover command may be a general handover command (RRC Reconfiguration with sync) transmitted and/or received in the RRC layer. The first handover command may be transmitted from the RRC layer of the CU of the first donor apparatus 200S, the first handover command being destined for the RRC layer of the UE 100.

After receiving the first handover command destined for the UE 100, the IAB node 300 suspends transfer of the first handover command to the UE 100 until the handover of the IAB node 300 has been performed. In other words, the IAB node 300 buffers the first handover command destined for the UE 100 until the handover of the IAB node 300 has been performed. In response to performance of handover of the IAB node 300, the IAB node 300 transfers, to the UE 100, the first handover command of which the transfer has been suspended (i.e., the first handover command buffered).

This enables the handover of the IAB node 300 and the handover of the UE 100 to be synchronously performed, thus allowing communication with the UE 100 to be prevented from being disrupted. As the first handover command, a general handover command can be used that is transmitted and/or received in the RRC layer, and thus the operation of the UE 100 need not be changed, and ensuring the backward compatibility of the UE 100 is facilitated.

In an embodiment, after transmitting the first handover command, the first donor apparatus 200S transmits, to the IAB node 300, a second handover command indicating the handover of the IAB node 300. The second handover command may be a general handover command (RRC Reconfiguration with sync) transmitted and/or received in the RRC layer. The second handover command may be transmitted from the RRC layer of the CU of the first donor apparatus 200S, the second handover command being destined for the RRC layer of the MT of the IAB node 300. In response to receiving the second handover command, the IAB node 300 performs the handover of the IAB node 300.

In an embodiment, before transmitting the first handover command, the first donor apparatus 200S transmits, to the IAB node 300, a first message for causing suspension of the transfer operation for transfer to the UE 100. In response to receiving the first message from the first donor apparatus 200S, the IAB node 300 suspends the transfer of the first handover command to the UE 100. In this way, the first donor apparatus 200S can control whether the first donor apparatus 200S is to suspend the transfer of the first handover command. Note that in a scenario in which the UE 100 is handed over to another IAB node under the first donor apparatus 200S, i.e., in an intra-CU handover scenario, the IAB node 300 need not suspend the transfer of the handover command from the donor apparatus 200 to the UE 100.

Hereinafter, the first message for causing suspension of the transfer operation for transfer to the UE 100 is referred to as a "UE SRB Suspend message." The UE SRB Suspend message may be an RRC message (e.g., an RRC Reconfiguration message) transmitted to the MT of the IAB node 300 or may be an F1 message transmitted to the DU of the IAB node 300. For example, in the RRC Reconfiguration message transmitted to the MT of the IAB node 300 or the F1 message transmitted to the DU of the IAB node 300, the information element "UE SRB Suspend" being set to "True" indicates the SRB for the UE 100 is suspended.

The UE SRB Suspend message may include at least one of an SRB number for suspension (0, 1, 2, or the like; however, in reality, only SRB2 is used), a backhaul bearer ID (RLC channel ID) linked with the SRB, the ID of the DU performing a suspend operation, and an expiration date of the suspend operation (timer value: the suspend operation is canceled when a timer expires).

The UE SRB Suspend message may be a message for suspending a bearer for the UE 100 (lower apparatus), and specifically, a Signaling Radio Bearer (SRB). The UE SRB Suspend message may be a message for suspending RRC message transmission for the UE 100 (lower apparatus).

In the IAB node 300 receiving the UE SRB Suspend message, the RRC layer of the MT or the F1 application protocol of the DU (FLAP) may provide a suspend indication to the BAP layer. In this case, the BAP layer suspends the SRB or RRC message transmission and buffers data received from the upper layer. However, data buffering may be performed in a layer other than the BAP.

In an embodiment, after the handover of the IAB node 300 is performed, the second donor apparatus 200T transmits, to the IAB node 300, the second message for causing performance (resumption) of transfer of the first handover command to the UE 100. In response to receiving the second message from the second donor apparatus 200T, the IAB node 300 transfers, to the UE 100, the first handover command of which the transfer has been suspended.

Hereinafter, the second message for causing performance (resumption) of transfer of the first handover command to the UE 100 is referred to as a "UE SRB Resume message". The UE SRB Resume message may be an RRC message (for example, an RRC Reconfiguration message) transmitted to the MT of the IAB node 300 or may be an F1 message transmitted to the DU of the IAB node 300. For example, in the RRC Reconfiguration message transmitted to the MT of the IAB node 300 or the F1 message transmitted to the DU of the IAB node 300, the information element "UE SRB Suspend" being set to "False" (or the IE is absent) indicates that the SRB suspend operation for the UE 100 is canceled (or when the SRB has been suspended, the SRB is resumed).

The UE SRB Resume message may include at least one of the SRB number for suspend cancellation (0, 1, 2, or the like; however, in reality, only SRB2 is used), the backhaul bearer ID (RLC channel ID) linked with the SRB, the ID of the DU of which the suspension is to be canceled.

The UE SRB Resume message may be a bearer for the UE 100 (lower apparatus), and specifically, a message for resuming the SRB. The UE SRB Resume message may be a message for resuming the RRC message transmission for the UE 100 (lower apparatus).

In the IAB node 300 receiving the UE SRB Resume message, the RRC layer of the MT or the F1 application protocol (F1 AP) of the DU may provide a resume indication to the BAP layer. In this case, the BAP layer resumes the SRB or RRC message transmission and transfers the RRC message buffered to the UE 100.

However, the UE SRB Resume message is not mandatory signaling and can be omitted. Specifically, the IAB node 300 may transmit and/or receive the RRC Reconfiguration Complete message to and/or from the second donor apparatus 200T to implicitly determine the resumption and perform the above-described operations.

Figure 7:
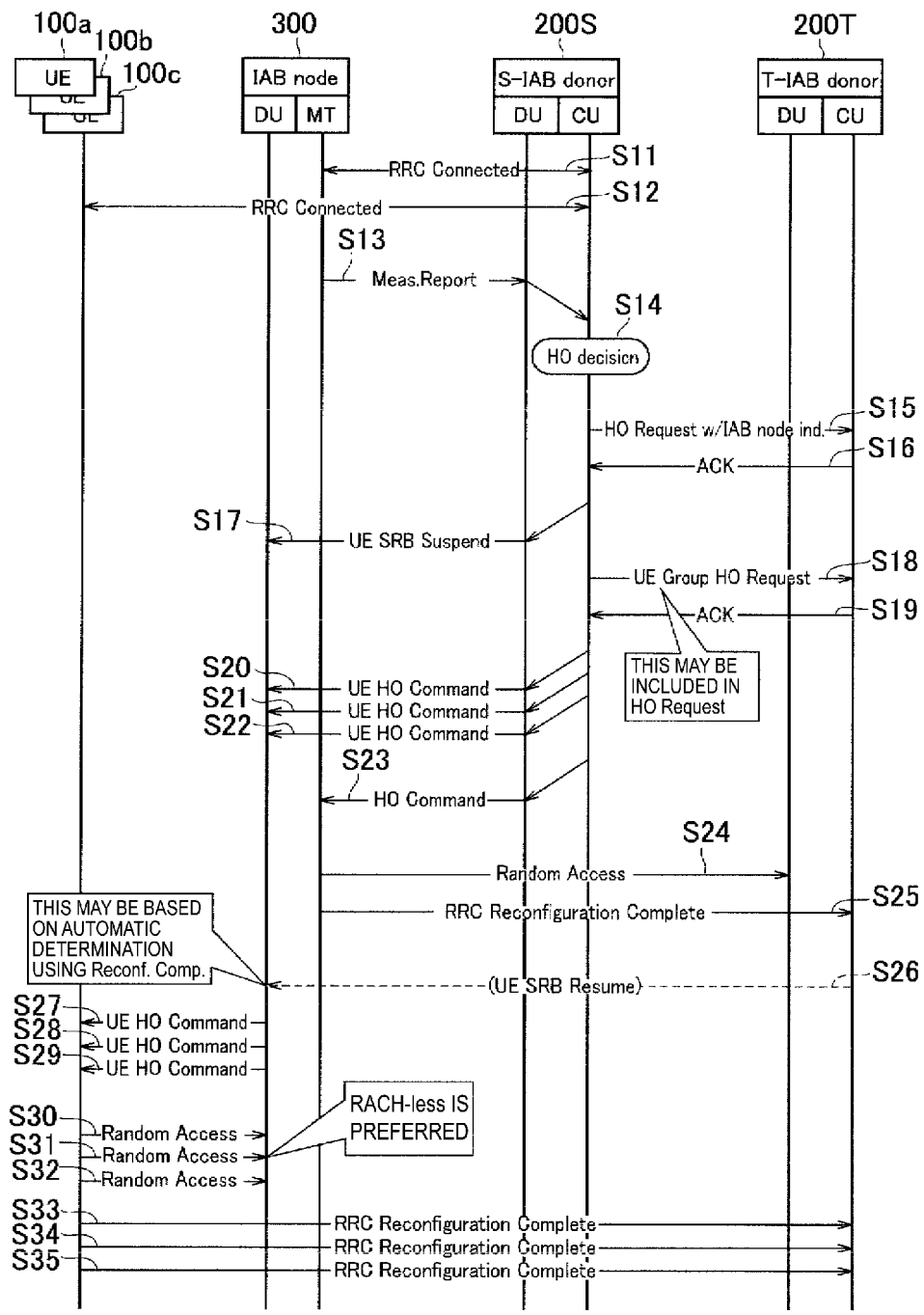
FIG. 7 is a diagram illustrating an example of an operating sequence of an inter-CU handover according to an embodiment.

FIG. 7 is a diagram illustrating an example of an operating sequence of an inter-CU handover according to an embodiment. In FIG. 7, the first donor apparatus 200S, used as a handover source of the IAB node 300, is designated as "S-IAB donor", and the second donor apparatus 200T, used as a handover destination (target) of the IAB node 300, is designated as "T-IAB donor."

As illustrated in FIG. 7, in step S11, the MT of the IAB node 300 establishes an RRC connection with the first donor apparatus 200S and is brought into an RRC connected state.

In step S12, each UE 100 establishes an RRC connection with the first donor apparatus 200S and is brought into the connected state.

In step S13, the MT of the IAB node 300 transmits, to the first donor apparatus 200S, a measurement report (Meas. Report) message including measurement results for the radio state of each cell. Here, the measurement report message may indicate that the radio state of the cell of the first donor apparatus 200S has been deteriorated and/or the radio state of the cell of the second donor apparatus 200T has been improved.

In step S14, the CU of the first donor apparatus 200S determines an inter-CU handover of the IAB node 300 from the first donor apparatus 200S to the second donor apparatus 200T, based on the measurement report message from the IAB node 300 (HO decision).

In step S15, the CU of the first donor apparatus 200S transmits, to the second donor apparatus 200T, a handover request (HO Request) message for the inter-CU handover of the IAB node 300.

In an embodiment, signaling between the first donor apparatus 200S and the second donor apparatus 200T is transmitted and/or received directly via the Xn interface, but signaling between the first donor apparatus 200S and the second donor apparatus 200T may be indirectly transmitted and/or received via the 5GC10 (specifically AMF11).

The handover request message in step S15 includes information for the handover of the IAB node 300. For example, the handover request message may include an identifier indicating that the handover type is an inter-CU handover of the IAB node.

The handover request message in step S15 may further include information for a handover of the UE 100 (e.g., a list including an Xn AP ID of each UE 100 and a context). In other words, a handover request (UE Group HO Request)

message in step S18 described below may be integrated with the handover request message in step S15. The integration of the handover requests as described above allows prevention of contradiction in which only one of the handover request message in step S15 and the handover request message in step S18 is permitted (ACK), whereas the other is rejected (NACK).

The description below assumes that the handover request in step S15 is permitted in the second donor apparatus 200T.

In step S16, the CU of the second donor apparatus 200T transmits, to the first donor apparatus 200S, an acknowledgement (ACK) message for the handover request in step S15.

In step S17, in response to receiving the acknowledgement message from the second donor apparatus 200T, the CU of the first donor apparatus 200S transmits the UE SRB Suspend message described above to the IAB node 300.

Note that, under the assumption that the handover request message in step S15 and the handover request message in step S18 are integrated, the first donor apparatus 200S transmits the UE SRB Suspend message to the IAB node 300 in response to receiving, from the second donor apparatus 200T, the acknowledgement message for the integrated handover request messages.

In step S18, the first donor apparatus 200S transmits, to the second donor apparatus 200T, a handover request (UE Group HO Request) message for an inter-CU handover of a group of UE 100. The handover request message in step S18 includes information for the handover of the UE 100 (e.g., a list including the Xn AP ID of each UE 100 and the context).

In step S19, the CU of the second donor apparatus 200T transmits, to the first donor apparatus 200S, an acknowledgement (ACK) message for the handover request in step S18.

In steps S20 to S22, in response to receiving the acknowledgement message from the second donor apparatus 200T, the CU of the first donor apparatus 200S transmits, to the IAB node 300, the first handover command (UE HO Command) destined for each UE 100. The first handover command indicates a handover (inter-CU handover) of the UE 100 from the first donor apparatus 200S to the second donor apparatus 200T.

Note that, under the assumption that the handover request message in step S15 and the handover request message in step S18 are integrated, the CU of the first donor apparatus 200S receives, from the second donor apparatus 200T, the acknowledgement message for the integrated handover request messages, and after transmitting the UE SRB Suspend message to the IAB node 300, transmits, to the IAB node 300, the first handover command (UE HO Command) destined for each UE 100.

The IAB node 300 suspends the transfer of the first handover command to the UE 100 due to the UE SRB Suspend message received in step S17.

In step S23, the CU of the first donor apparatus 200S transmits, to the IAB node 300, a second handover command (HO Command) indicating a handover (inter-CU handover) of the IAB node 300 from the first donor apparatus 200S to the second donor apparatus 200T.

In step S24, in response to receiving the second handover command, the MT of the IAB node 300 performs Random Access to the DU of the second donor apparatus 200T.

In step S25, the MT of the IAB node 300 ends the random access to the second donor apparatus 200T, and transmits, to the CU of the second donor apparatus 200T, the RRC Reconfiguration Complete message indicating the end of handover.

In step S26, the CU of the second donor apparatus 200T transmits the UE SRB Resume message described above to the IAB node 300. However, the UE SRB Resume message is not mandatory signaling and can be omitted.

In steps S27 to S29, the DU of the IAB node 300 transfers, to each UE 100, the first handover command of which the transfer to the UE 100 has been suspended.

In steps S30 to S32, in response to receiving the first handover command, each UE 100 performs Random Access to the DU of the first donor apparatus 200S. However, steps S30 to S32 are not mandatory processing, and a handover (RACH-less HO) including no random access is applicable.

In steps S33 to S35, each UE 100 transmits, to the CU of the second donor apparatus 200T, an RRC Reconfiguration Complete message indicating the end of handover.

When the handover request message in step S15 in FIG. 7 and the handover request message in step S18 in FIG. 7 are transmitted separately, a situation may occur in which the former is permitted (ACK), whereas the latter is rejected (NACK). The handover request message in step S18 is transmitted as one message in FIG. 7, but may be transmitted separately for each UE. In either case, the handover request message in step S18 may be rejected (NACK) for some UEs.

In this case, in response to receiving a negative acknowledgement message from the second donor apparatus 200T, the CU of the first donor apparatus 200S may transmit, to the IAB node 300, an RRC Release message destined for the UE 100 to be negatively acknowledged. In other words, the CU of the first donor apparatus 200S may transmit the RRC Release message to the IAB node 300 instead of at least one of the first handover commands (UE HO Commands) in steps S20 to S22.

The DU of the IAB node 300 may suspend the transfer of the RRC Release message to the UE 100 according to the UE SRB Suspend message in step S17. For example, when the random access in step S24 fails and the first donor apparatus 200S then determines the inter-CU handover of the IAB node 300 again, the connection between the UE 100 to be NACKed and the first donor apparatus 200S is preferably maintained. In this case, the DU of the IAB node 300 does not transmit the RRC Release message to the UE 100. The MT of the IAB node 300 may notify the IAB donor 200S that the suspended RRC Release message is not transmitted (i.e., an RRC Release Cancel message). The DU of the IAB node 300 may suspend the transfer of the RRC Release message to the UE 100 according to the UE SRB Suspend message in step S17 and transmit the message to the UE 100 at the same timing as that for steps S27 to S29 after steps S23 to S26.

In response to receiving the RRC Release message, the DU of the IAB node 300 may immediately transfer the RRC Release message to the UE 100. With release of the connection between the IAB node 300 and the UE 100 to be NACKed, in other words, the UE 100 determined to be prevented from being handed over, the UE 100 can quickly establish a connection with another IAB node.

OTHER EMBODIMENTS

In the embodiments described above, an example has been mainly described, in which the mobile communication system 1 is a 5G mobile communication system. However, the base station in the mobile communication system 1 may be an eNB used as an LTE base station. The core network in the mobile communication system 1 may be an Evolved Packet Core (EPC). Furthermore, the gNB can also be connected to the EPC, the eNB can also be connected to the 5GC, and the gNB and the eNB can also be connected via an inter-base station interface (Xn interface, X2 interface).

A program may be provided that causes a computer to execute each of the processing operations according to the embodiments described above. The program may be recorded in a computer-readable medium. Use of the computer-readable medium enables the program to be installed on a computer. Here, the computer-readable medium on which the program is recorded may be a non-transitory recording medium. The non-transitory recording medium is not particularly limited and may be, for example, a recording medium such as a CD-ROM or a DVD-ROM. A chip set may be provided that includes a memory that stores a program for executing each of the processing operations performed by the UE 100, the gNB 200, or the IAB node 300 and a processor that executes the program stored in the memory.

The invention claimed is:

1. A handover control method for performing a handover of a relay apparatus from a first donor apparatus or an apparatus lower than the first donor apparatus to a second donor apparatus or an apparatus lower than the second donor apparatus, the handover control method comprising:
    transmitting, by the first donor apparatus, a first RRC message indicating a handover of a lower apparatus lower than the relay apparatus to the lower apparatus;
    receiving, by the relay apparatus, the first RRC message, and then suspending transfer of the first RRC message to the lower apparatus until the handover of the relay apparatus is performed; and
    by the relay apparatus, in response to performance of the handover of the relay apparatus, transferring to the lower apparatus the first RRC message of which the transfer is suspended.

2. The handover control method according to claim 1, further comprising:
    by the first donor apparatus, after transmitting the first RRC message, transmitting a second RRC message indicating a handover of the relay apparatus to the relay apparatus; and
    by the relay apparatus, in response to receiving the second RRC message, performing a handover of the relay apparatus.

3. The handover control method according to claim 1, further comprising:
    by the first donor apparatus, before transmitting the first RRC message, transmitting to the relay apparatus a first message for suspending an operation of transfer to the lower apparatus, wherein
    the suspending of the transfer of the first RRC message to the lower apparatus includes suspending, by the relay apparatus, transfer of the first RRC message to the lower apparatus in response to receiving the first message.

4. The handover control method according to claim 1, further comprising:
    after performing the handover of the relay apparatus, transmitting, by the second donor apparatus, to the relay apparatus, a second message for transferring the first RRC message to the lower apparatus, wherein
    the transferring to the lower apparatus the first RRC message of which the transfer is suspended includes transferring, by the relay apparatus, the first RRC message of which the transfer is suspended to the lower apparatus in response to receiving the second message.

5. The handover control method according to claim 1, further comprising:
    by the first donor apparatus, in response to determining the handover of the relay apparatus, transmitting to the second donor apparatus a handover request including information for a handover of the relay apparatus and information for a handover of the lower apparatus.

6. A relay apparatus for performing a handover from a first donor apparatus or an apparatus lower than the first donor apparatus to a second donor apparatus or an apparatus lower than the second donor apparatus, the relay apparatus comprising:
    at least one processor configured to execute:
    receiving a first RRC message transmitted from the first donor apparatus and indicating a handover of a lower apparatus lower than the relay apparatus;
    receiving the first RRC message and then suspending transfer of the first RRC message to the lower apparatus until the handover of the relay apparatus is performed; and
    transferring to the lower apparatus the first RRC message of which the transfer is suspended in response to performance of the handover of the relay apparatus.

7. A first donor apparatus for a handover of a relay apparatus from the first donor apparatus or an apparatus lower than the first donor apparatus to a second donor apparatus or an apparatus lower than the second donor apparatus, the first donor apparatus comprising:
    at least one processor configured to execute:
    transmitting to the relay apparatus a first message for suspending an operation of transfer from the relay apparatus to a lower apparatus lower than the relay apparatus until the handover of the relay apparatus is performed;
    transmitting to the lower apparatus a first RRC message indicating a handover of the lower apparatus; and
    transmitting to the relay apparatus a second RRC message indicating a handover of the relay apparatus.

* * * * *